United States Patent
Lok et al.

(10) Patent No.: US 8,185,664 B1
(45) Date of Patent: May 22, 2012

(54) SYSTEM AND METHOD TO RESTORE MAXIMUM PAYLOAD SIZE IN A NETWORK ADAPTER

(75) Inventors: Ying P. Lok, Ladera Ranch, CA (US); Arun Mittal, Mission Viejo, CA (US); Lingling Polican, Fountain Valley, CA (US); Sribardhan Patnaik, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 119 days.

(21) Appl. No.: 12/817,707

(22) Filed: Jun. 17, 2010

Related U.S. Application Data

(60) Provisional application No. 61/187,906, filed on Jun. 17, 2009.

(51) Int. Cl.
*G06F 15/16* (2006.01)
(52) U.S. Cl. ........................................ 709/250
(58) Field of Classification Search .................. 709/250
See application file for complete search history.

(56) References Cited

U.S. PATENT DOCUMENTS

| | | | | |
|---|---|---|---|---|
| 6,229,538 B1* | 5/2001 | McIntyre et al. | ............ | 715/734 |
| 6,721,805 B1* | 4/2004 | Bhagwat et al. | ............ | 709/250 |
| 6,934,768 B1* | 8/2005 | Block et al. | .................... | 709/248 |
| 7,085,855 B1* | 8/2006 | Sato et al. | ...................... | 709/253 |
| 2001/0034799 A1* | 10/2001 | Ito et al. | ........................ | 709/250 |
| 2010/0064080 A1* | 3/2010 | Shah et al. | .................... | 710/105 |

* cited by examiner

*Primary Examiner* — Brian P Whipple
(74) *Attorney, Agent, or Firm* — Klein, O'Neill & Singh, LLP

(57) ABSTRACT

Method and system for managing a maximum payload size (MPS) between a host system and an adapter is provided. The method includes storing a host maximum payload size (MPS) value of the host system as an adapter MPS value for the adapter operationally coupled to the host system; storing a host identifier at the adapter for identifying the host system; setting an adapter MPS value to the host MPS value; resetting the adapter MPS value to a default value after an event; and restoring the adapter MPS value to the host MPS value when the host identifier stored at the adapter matches with a host identifier value stored by the host system.

7 Claims, 6 Drawing Sheets

SYSTEM AND METHOD TO RESTORE MAXIMUM PAYLOAD SIZE IN A NETWORK ADAPTER

CROSS-REFERENCE TO RELATED APPLICATIONS

This patent application claims priority under 35 USC 119 (e), to U.S. Provisional Application Ser. No. 61/187,906, filed on Jun. 17, 2009, entitled "SYSTEM AND METHOD TO RESTORE MAXIMUM PAYLOAD SIZE IN A NETWORK ADAPTER", the disclosure of which is incorporated herein by its entirety.

TECHNICAL FIELD

The present invention relates to network adapters.

BACKGROUND

Computing systems communicate with other devices using adapters, e.g. host bus adapters, network interface cards or adapters that can handle both network and storage traffic. During initialization, for example, during a boot process, a computing system (may also be referred to as "host system") sets up various parameters for transfer of data between the host system and other devices via the adapter. One such parameter is a maximum payload size (MPS). The MPS defines a maximum size of a payload, typically in bytes, that can be transmitted between the host system and the adapter. The adapter typically uses a default MPS value. The default MPS value may be different from the MPS value that is used by the host system to transfer data. To avoid conflict, the host system may change the default MPS value of the adapter to the value that is used by the host system.

For various operational and functional reasons, (for example, power saving modes like hibernation), the host system may switch to a mode when minimal functionality of the host system is maintained. In some of these modes, the host system may disable the adapter, for example, to conserve energy. When the host system is instructed to be switched back to normal operation, the host system instructs the adapter to be enabled.

When the adapter is disabled, the host system performs a reset operation. During the reset operation, the adapter MPS value may be reset to the default MPS value. When the adapter is enabled, the host MPS value and the adapter MPS value will be different. The mismatch in the host MPS value and adapter MPS value may cause errors during data transfer between the host system and the adapter. Continuous efforts are being made to reduce errors during data transfer.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide advantages, which include using a same maximum payload size for a computing system and an adapter.

In one embodiment, a machine-implemented method is provided. The method includes storing a host maximum payload size (MPS) value of a host system as an adapter MPS value for an adapter operationally coupled to the host system; storing a host identifier at the adapter for identifying the host system; setting an adapter MPS value to the host MPS value; resetting the adapter MPS value to a default value after an event; and restoring the adapter MPS value to the host MPS value when the host identifier stored at the adapter matches with a host identifier value stored by the host system.

In another embodiment, a machine implemented method is provided. The method includes comparing if a host system identifier for a host system matches with a host system identifier stored at an adapter operationally coupled to the host system for sending and receiving information; storing a host maximum payload size (MPS) value of a host system as an adapter MPS value for the adapter; and restoring the adapter MPS value to the host MPS value after an event that resets the adapter MPS value to a default value that is different from the host identifier MPS value.

In yet another embodiment, a system is provided. The system includes a host system having a first memory location for storing a host maximum payload size (MPS) value and a second memory location for storing a host identifier for uniquely identifying the host system.

The system further includes an adapter operationally coupled to the host system and having a first adapter memory location for storing the host identifier value that identifies the host system; a second adapter memory location for storing an adapter MPS value that matches the host MPS value; and a third memory location that stores an adapter MPS value when the adapter is initialized. After the adapter is reset due to an event, the third memory location value is set to the host MPS value when the host identifier stored at the first adapter memory location matches with the host identifier stored at the second memory location of the host system.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of the various aspects of this disclosure. In the drawings, the same components have the same reference numerals. The illustrated embodiments are intended to illustrate, but not to limit the invention. The drawings include the following Figures.

DETAILED DESCRIPTION

In one aspect, a device and method is provided to maintain a consistent maximum payload size ("MPS") value for both an adapter and a computing system. As described below, this enables robust design and reliable operations involving peripheral devices.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

To facilitate an understanding of the various aspects of this disclosure, the general architecture and operation of a PCI-Express system will be described. The specific architecture and operation of the various aspects will then be described with reference to the general architecture of the host system and the adapter.

Figure 1A:
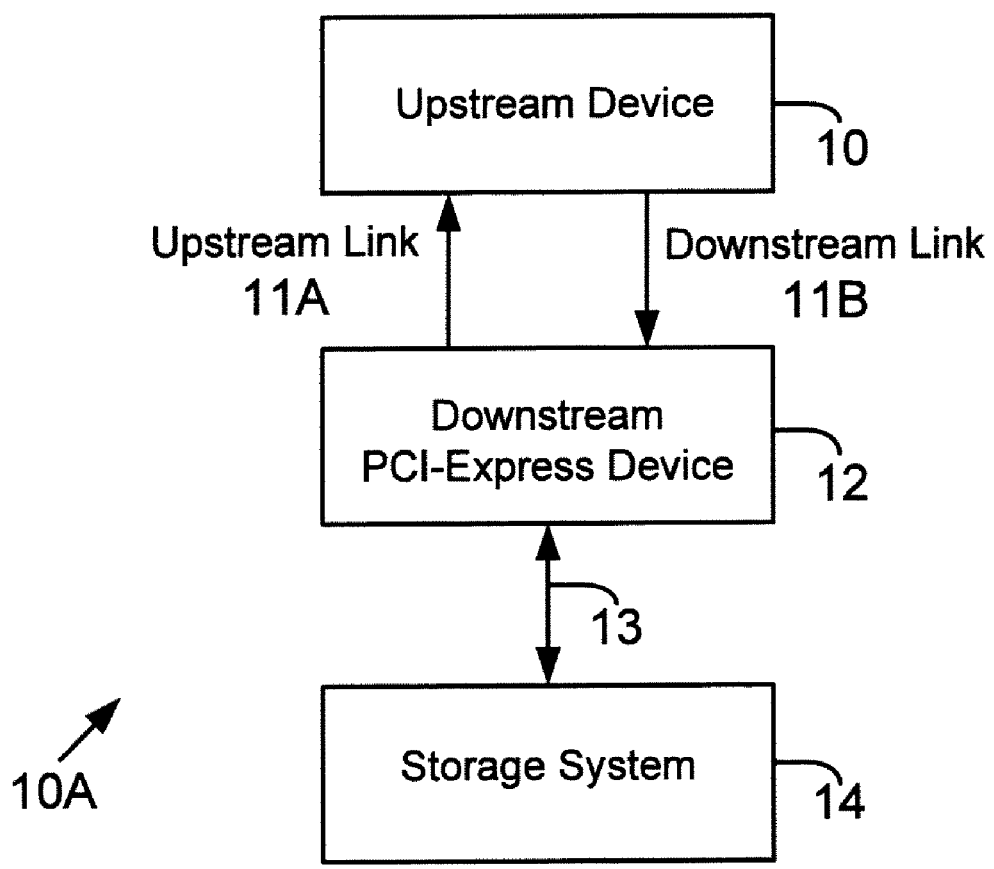
FIG. 1A shows a block diagram of a PCI-Express system.

PCI-Express System Overview:

FIG. 1A shows a top-level block diagram of a system 10A that includes an upstream PCI-Express device 10 that communicates with a storage system 14 via a downstream PCI-Express device 12. Upstream PCI-Express link (or path) 11A is used for communication from downstream PCI-Express device 12 to upstream device 10; while downstream link (or path) 11B is used for communication from upstream device 10 to downstream PCI-Express device 12.

PCI-Express links 11A and 11B comply with the PCI-Express standard that defines a standard interface incorporating PCI transaction protocols developed to offer better performance than the PCI or PCI-X bus standards. PCI (Peripheral Component Interconnect) is a commonly used local bus standard used for connecting peripherals. PCI-X is another standard bus that is compatible with existing PCI cards using the PCI bus. It is noteworthy that the various embodiments disclosed herein are not limited to any particular industry standard or specification.

Downstream PCI-Express device 12 communicates with a storage system 14 via link 13. Link 13 may be any link, for example, a Fibre Channel link.

Upstream device 10 may be a computing system (may also be referred to as a host system) and downstream PCI-Express device 12 may be an adapter (may also be referred to as a host bus adapter (HBA) and/or "controller"), as described below. Although, the examples below are based on host computing systems and adapters operating in a storage area network (SAN), the various adaptive aspects of the present invention as described in the appended claims are not limited to the SAN environment.

Figure 1B:
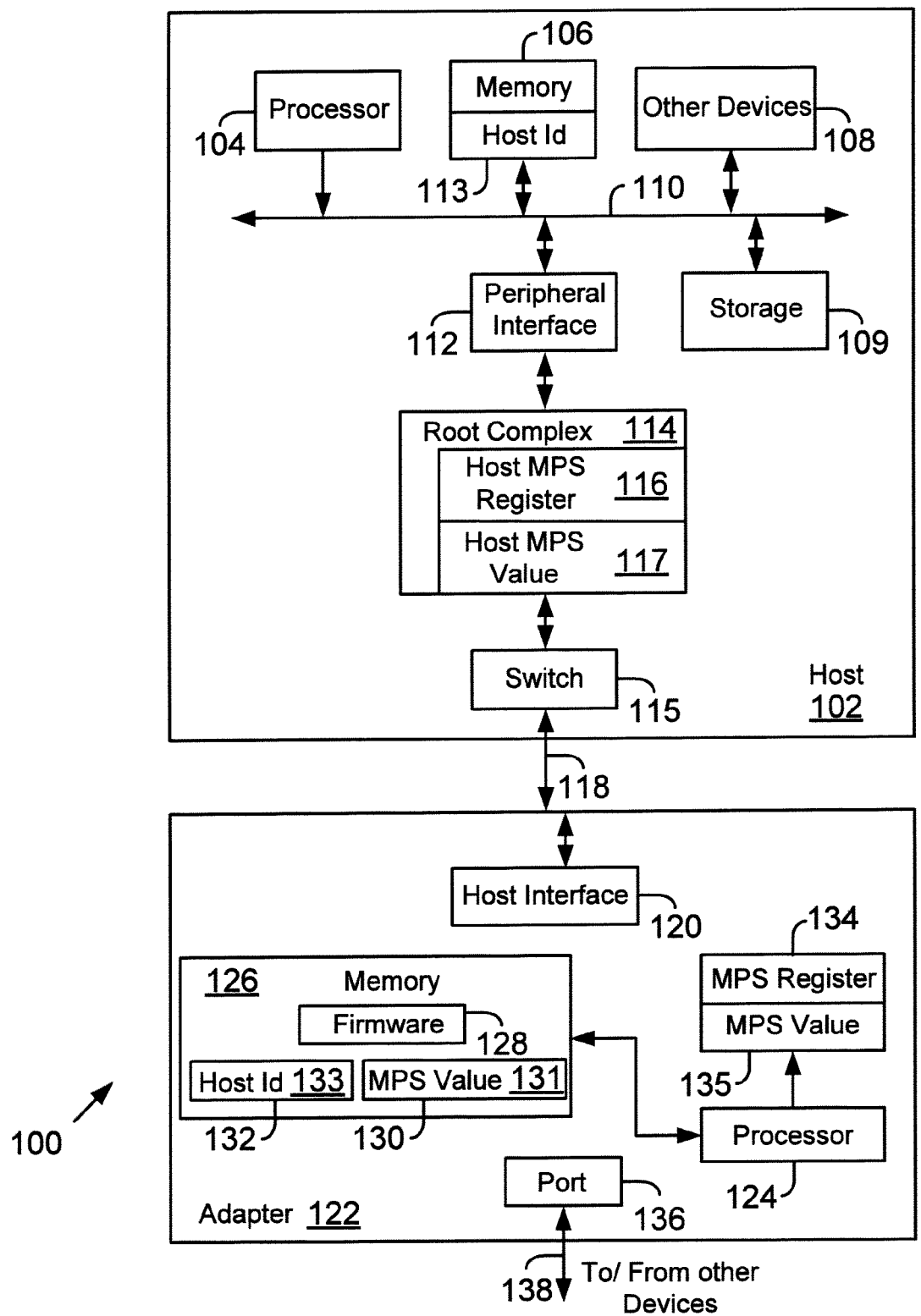
FIG. 1B shows a block diagram of a system for sending and receiving information, according to one embodiment.

System:

FIG. 1B shows a block diagram of a system 100 for sending and receiving information from other devices. System 100 may include a computing system 102 (also known as "host system" or "host") and an adapter 122. Adapter 122 interfaces between host system 100 and other devices (not shown) via a link 138.

Host system 102 may include one or more processors 104 (jointly referred to as processor 104), also known as a central processing unit (CPU), interfacing with other components via a bus 110. Bus 110 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

Host system 102 may include or may have access to a mass storage device 109, which may be for example a hard disk, a CD-ROM, a non-volatile memory device (flash or memory stick) or any other device. Storage 109 may store processor executable instructions and data, for example, operating system program files, application program files, and other files.

Host system 102 interfaces with memory 106 that may include random access main memory (RAM), and/or read only memory (ROM). When executing stored computer-executable process steps from storage 109, the processor 104 may store and execute the process steps out of memory 106. ROM may store invariant instruction sequences, such as start-up instruction sequences or basic input/output operating system (BIOS) sequences for operation of a keyboard (not shown).

The host system 102 may also include other devices and interfaces 108, which may include a display device interface, a keyboard interface, a pointing device interface and others.

Host system 102 also interfaces with a peripheral interface 112 via bus 110. The peripheral interface 112 is coupled to a "root complex" 114. Root complex 114 as defined by the PCI Express standard is an entity that includes a Host Bridge and one or more Root Ports. The Host Bridge connects a CPU to a Hierarchy, where a Hierarchy is a tree structure based on a PCI Express topology. The Root complex 114 connects to a standard PCI Express switch 115 that couples to adapter 122, via a bus (or link) 118, which in this case may be a PCI Express bus.

Host processor 104 may communicate with adapter 122 via switch 115. It is noteworthy that the path between root complex 114 and adapter 122 can also be a direct path with no switch, or can include multiple cascaded switches.

The root complex 114 may include a host MPS (Maximum Payload Size) register 116 or any other type of storage location. The host MPS register 116 stores a host MPS value 117 that indicates the MPS size used by host system 102 to send information to adapter 122.

The host system 102 is uniquely identified by using a host identifier ("host Id") 113. The host Id 113 can vary in formation, for example, host Id 113 may be a unique host name, a unique identification value, a system serial number or any other format that can be used to uniquely identify host system 102. In one embodiment, host Id 113 may be coded and stored in a register (not shown) and is readable by processor 104. In another embodiment, the host Id 113 is stored in memory 106. In yet another embodiment, the host Id 113 can be programmed by programmable instructions, for example, by an operating system.

Adapter 122 includes a processor 124, a host interface 120, a memory 126, an adapter MPS register 134 (or storage location 134) and a port 136. The host interface 120 is configured to interface with the host system 102, via bus 118. The structure and logic used by host interface 120 is designed to handle the protocol used by bus 118. For example, if bus 118 is a PCI-Express link, then host interface 120 is able to handle PCI-Express protocol requirements when communicating with host system 102. The adapter MPS register 134, port 136 and memory 126 are accessible to adapter processor 124.

Memory 126 is used to store programmable instructions, for example, adapter firmware 128. Adapter processor 124 executes firmware 128 to control the overall functionality of adapter 122.

Memory 126 may also include a storage location 130 that may be referred to as an adapter MPS store 130 to store an adapter MPS value 131. In one embodiment, the adapter MPS value 131 is set to be the same as the host MPS value 117 stored in host MPS register 116.

Memory 126 may also include another storage location 132 that may be referred to as a "host Id store 132" that is used to store a host Id value 133. In one embodiment, the host Id value 133 is set so that it is the same as host Id 113 stored at host system 102.

The adapter MPS register 134 can be used to store the adapter MPS register value 135 that is used by the adapter processor 124 to determine the payload size used by adapter 122 to transfer information. The use of adapter MPS value 135 is described below in more detail with respect to the process flow diagrams.

Port 136 is used to send information to and receive information from other devices via link 138. In an exemplary implementation, adapter 122 may be similar to a host bus adapter available from Qlogic Corporation. In some embodiments, the adapter 122 may interface with fibre channel devices via link 138. In another embodiment, adapter 122 may be a Fibre Channel over Ethernet (FCOE) adapter that can handle both network and storage traffic.

Figure 2:
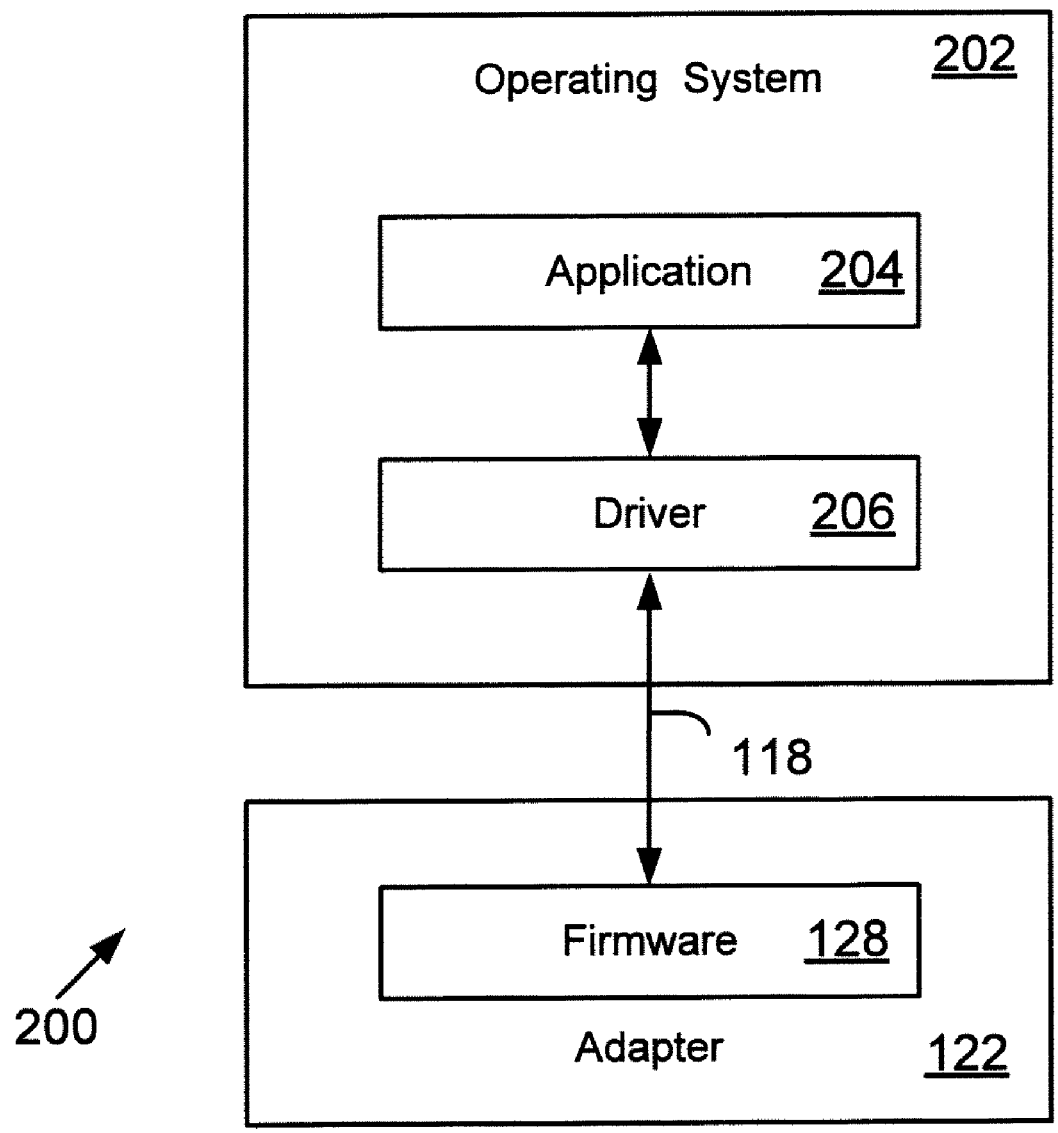
FIG. 2 shows an example of a software architecture used by the system of FIG. 1B.

FIG. 2 shows an example of a software architecture 200 used by system 100 of FIG. 1B. Software architecture 200 includes an operating system 202 for controlling overall host system 102 operations. The operating system 202 may be a Windows® based system provided by Microsoft Corp. or any other type, for example, a Linux® based operating system. Within the operating system 202 context, one or more application 204 may be executed by host system 102 to communicate with other devices via adapter 122. Application 204 communicates with firmware 128 via an adapter driver 206.

The adapter driver 206 may be executed by the host processor 104 and initiates communication with the adapter 122, via bus 118. The communication received from the host system 102 is decoded by the adapter processor 124 (or any other module) and appropriate instructions are executed by the adapter processor 124 or any other module affected by the instructions. The functionality of the various FIG. 2 modules is described below with respect to the process flow diagrams shown in FIGS. 3-5.

Figure 3:
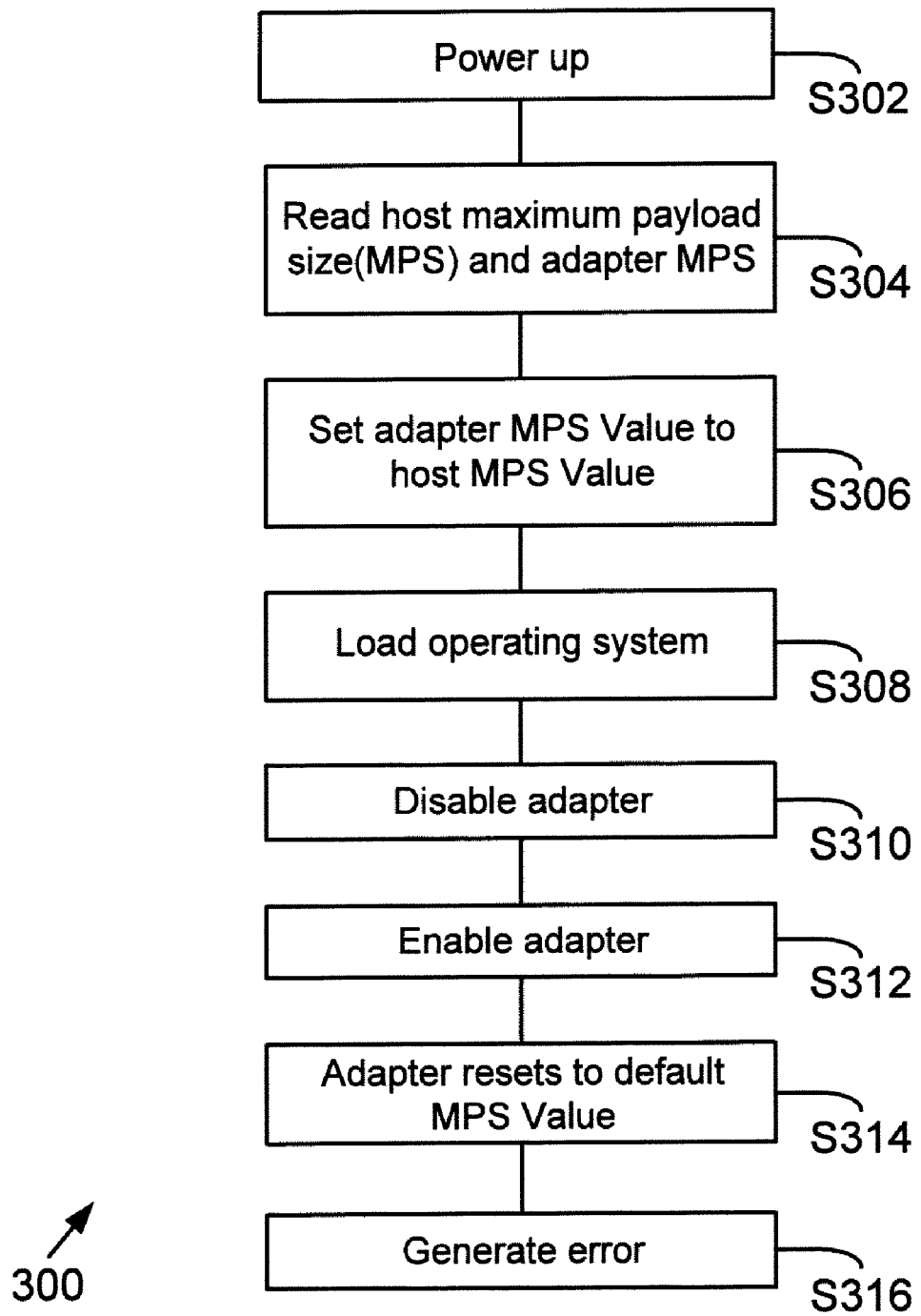
FIG. 3 shows an initialization process for setting a maximum payload size value for an adapter.

Process Flow:

FIG. 3 shows an initialization process 300 where an error may be generated when different MPS values are used by host system 102 and adapter 122. The process starts in block S302, when host system 102 and adapter 122 are powered up.

In block S304, processor 104 executing BIOS (Basic Input/Output System) instructions reads the host MPS value 117 from host MPS register 116, for example, the host MPS value 117 may be X1. The adapter default MPS value 135 is also read and may be X2, i.e. the adapter default MPS value may be different from the host MPS value X1.

In block S306, the adapter MPS value 135 is set to host MPS value, i.e., X1, at adapter MPS register 134. In block S308, operating system 202 is loaded and host system 102 starts functioning.

In block S310, adapter 122 is disabled. Adapter 122 may be disabled for various reasons, for example, adapter 122 may be disabled when operating system 202 instructs the host system 102 to switch to a hibernation mode. During hibernation mode to save power and resources, host system 102 may disable adapter 122 with other modules. In some embodiments, adapter 122 may simply be turned off.

In block S312, adapter 122 is enabled. The operating system 202 may instruct host system 102 to resume normal operations and enable adapter 122. In block S314, adapter 122 resets the adapter MPS value to its default value of X2. Because of the reset, the host MPS value and the adapter MPS value become different again.

In block S316, an error may occur during data transfer between the host system 102 and adapter 122. The error may occur due to a mismatch in the host MPS value 117, which is set to X1 and adapter MPS value 135 which is set to X2. The adaptive embodiments disclosed herein reduce these errors by using the same MPS value for both the adapter and the host system, as described below in more detail.

Figure 4:
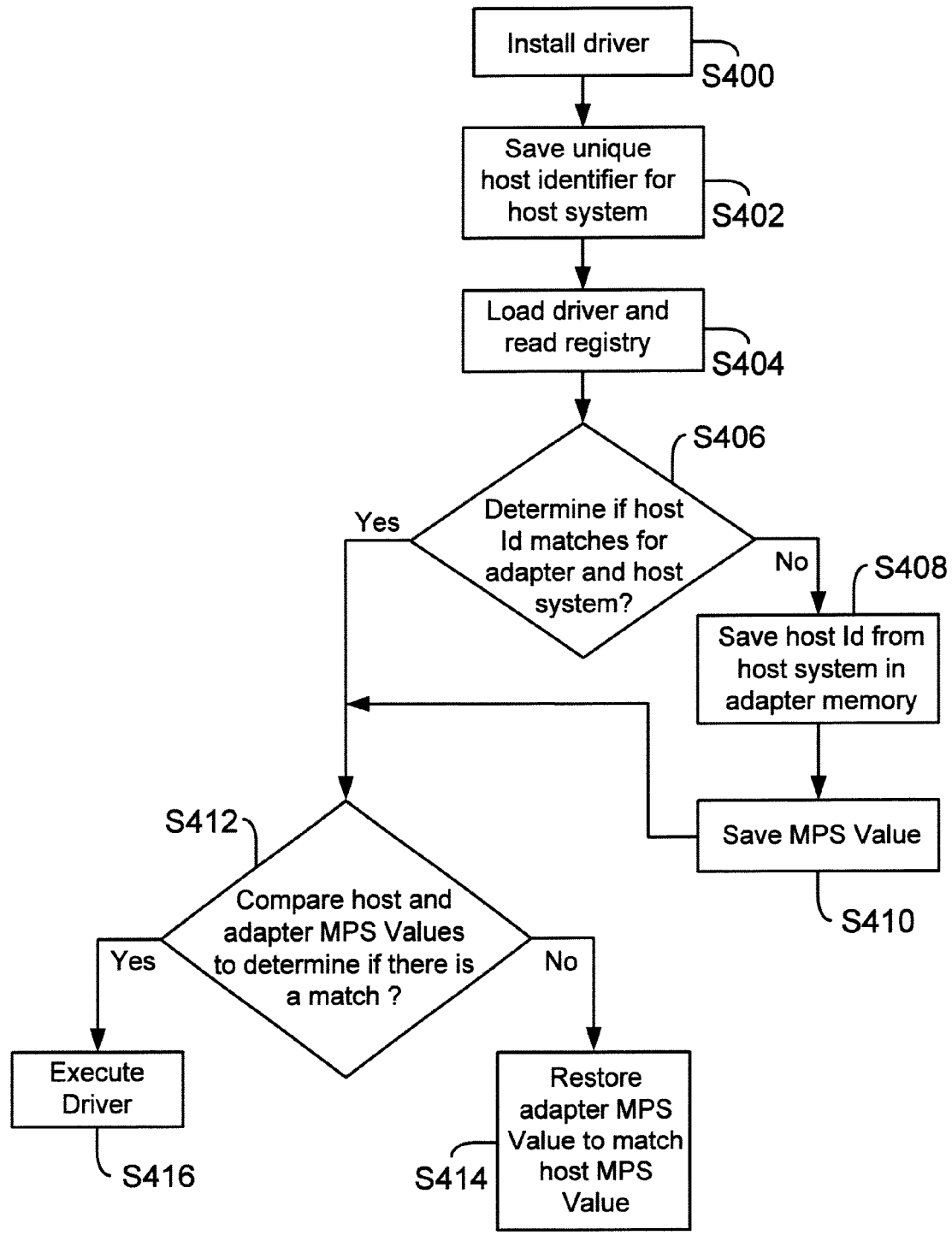
FIG. 4 shows an example of an adapter driver installation process according to one embodiment.

FIG. 4 shows a process flow diagram for installing an adapter driver that reduces errors during data transfer between an adapter and a host system, according to one embodiment. The process begins in block S400 when adapter driver 206 (FIG. 2) is installed by host system 102 (FIG. 1B). In block S402, host Id 113, identifying host system 102 is saved. The host Id can be any indicia that may uniquely identify the host system. For example, the host Id may be a host name, a unique identifier value, a unique serial number and others. In one embodiment, driver 206 determines the host Id 113 by polling or reading a specific storage location in host system 102.

In block S404, driver 206 is loaded and system information is read from a registry (not shown). Driver 206 may also issue commands to adapter 122 to read and retrieve configuration information from one or more memory locations of adapter 122. For example, driver 206 may read host Id value 133 and adapter MPS register value 135 (FIG. 1B).

In block S406, driver 206 determines if the host Id value 113 matches host Id value 133 stored by adapter 122.

If there is no match, then driver 206 stores the host Id value 113 as a new host Id value 133 in adapter memory 126 in block S408.

In block S410, adapter 122 also saves the host MPS value 117 as adapter MPS value 131. The driver also stores the host MPS value 117 at adapter MPS register 134 as adapter MPS register value 135. The process then moves to block S412.

If in block S406 there is a match (or after block S410), then in block S412, driver 206 determines if the host MPS value 117 and the adapter MPS register value 135 are the same.

If they are not the same, in block S414, driver 206 restores the adapter MPS register value 135 to the adapter MPS value 131 which is the same as host MPS value 117. For example, driver 206 instructs the adapter 122 to read the adapter MPS value 131 and write it at the adapter MPS register 134. Because the adapter MPS value 131 is the same as the host MPS value 117, the adapter MPS register value 135 is restored to the host MPS value 117.

If the values in block S412 are the same, or after block S414, the driver continues to execute other steps in block S416 to complete driver 206 installation and configuration.

Figure 5:
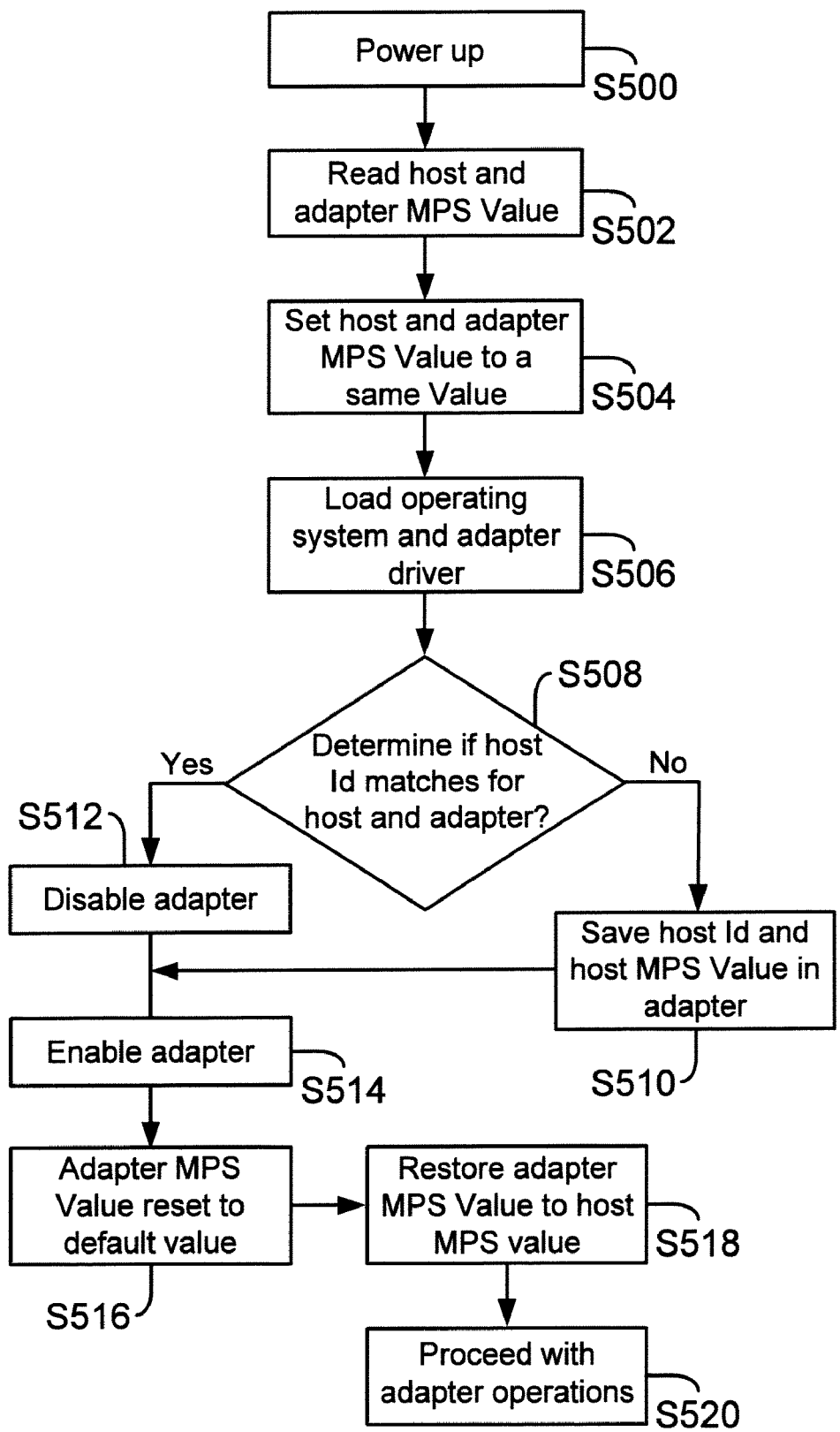
FIG. 5 shows a data transfer process, according to one embodiment.

FIG. 5 shows a process flow diagram for transferring data between adapter 122 and host system 102, according to one embodiment. The process begins in block S500 when system 100 (FIG. 1B) is powered up. In block S502, the host MPS value 117 is read. For example, the host MPS value 117 may be read from a root complex register 116. In block S504, the host MPS value 117 and the adapter MPS value 135 are both set to a same value, for example, X1. Thereafter, in block S506, the operating system 202 and the adapter driver 206 (FIG. 2) are loaded from memory 106 (FIG. 1B).

In block S508, adapter driver 206 determines if the host Id 113 matches with the host Id 133 that is stored at adapter memory 126. If the host Id 133 does not match with host Id 113, then the host Id value 133 is replaced by the host Id value 113 maintained by host system 102 in block 5510. In addition, the host MPS value 117 is stored as adapter MPS value 131 in adapter memory 126. The host MPS value 117 is also stored as adapter MPS register value 135 at register 134. Thereafter the process moves to block S514.

In block S508, if the host Ids stored by the adapter 122 and the host system 102 match, then adapter 122 is used to transfer information, until the process reaches block 5512, when adapter 122 is disabled. In one embodiment, adapter 122 may be disabled due to an event, for example, hibernation that is managed by operating system 202. During hibernation, the host system 102 powers down various modules, including adapter 122. Thereafter, in block 5514, the adapter is enabled. In one embodiment, adapter 122 is enabled by an operating system event, for example, after hibernation.

In block S516, the adapter MPS register 134 is reset, as part of adapter initialization. In one embodiment, adapter 122 resets the adapter MPS register value 135 to a default value, for example, X2.

In block 5518, the adapter MPS register value 135 is restored to the host MPS value 117 stored at memory location 130. Thereafter, in block S520, adapter 122 begins data transfer. Because the host MPS value and the adapter MPS values are the same, data transfer proceeds without any errors.

In one embodiment, robust data transfer occurs between a host system and an adapter, even if the adapter is disabled and then enabled by an external event, for example, an operating system initiated hibernation. In another embodiment, an adapter with a first MPS value can be swapped with another adapter that may have a different MPS value. The system and method disclosed herein recognizes the change, by detecting a mismatch in the host Id and then, setting the proper MPS values that match with the host MPS value. These features may be beneficial for example, in systems where hot-swapping of adapters is commonly used.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine-implemented method, comprising:
    storing a host maximum payload size (MPS) value of a host system as an adapter MPS value for an adapter operationally coupled to the host system;
    storing a host identifier at the adapter for identifying the host system;
    setting an adapter MPS value to the host MPS value;
    resetting the adapter MPS value to a default value after an event;
    restoring the adapter MPS value to the host MPS value when the host identifier stored at the adapter matches with a host identifier value stored by the host system;
    reading the host MPS value from a root complex register of the host system before storing the host MPS value at the adapter; and
    storing a new host MPS value and a new host identifier in the adapter when the host identifier stored by the adapter does not match with the host identifier stored by the host system.

2. The method of claim 1, wherein the event disables the adapter.

3. A machine implemented method, comprising:
    determining whether a host system identifier for a host system matches with a host system identifier stored at an adapter operationally coupled to the host system for sending and receiving information;
    storing a host maximum payload size (MPS) value of a host system as an adapter MPS value for the adapter;
    restoring the adapter MPS value to the host MPS value after an event that resets the adapter MPS value to a default value that is different from the host identifier MPS value;
    reading the host MPS value from a root complex register of the host system before storing the host MPS value at the adapter; and
    storing a new host MPS value and a new host identifier in the adapter when the host identifier stored by the adapter does not match with the host identifier stored by the host system.

4. A system, comprising:
    a host system having a first host system memory location for storing a host maximum payload size (MPS) value and a second host system memory location for storing a host identifier for uniquely identifying the host system; and
    an adapter operationally coupled to the host system and having a first adapter memory location for storing the host identifier value that identifies the host system; a second adapter memory location for storing an adapter MPS value that matches the host MPS value; and a third adapter memory location that stores an adapter MPS value when the adapter is initialized;
    wherein after the adapter is reset due to an event, the third adapter memory location value is set to the host MPS value when the host identifier stored at the first adapter memory location matches with the host identifier stored at the second host system memory location;

wherein the first host system memory location is a root complex register for storing the host MPS value; and wherein a new host MPS value and a new host identifier is stored at the adapter when the host identifier stored at the first adapter memory location does not match with the host identifier stored by the host system.

5. The system of claim 4, wherein the first adapter memory location is located at an adapter memory for storing the host identifier.

6. The system of claim 4, wherein the second adapter memory location is located at an adapter memory for storing the adapter MPS value that matches with the host MPS value.

7. The system of claim 4, wherein the third adapter memory location is a register for storing the adapter MPS value that is used by an adapter processor for transferring information to and from the host system.

* * * * *

UNITED STATES PATENT AND TRADEMARK OFFICE
CERTIFICATE OF CORRECTION

Page 1 of 1

PATENT NO.        : 8,185,664 B1
APPLICATION NO.   : 12/817707
DATED             : May 22, 2012
INVENTOR(S)       : Ying P. Lok et al.

It is certified that error appears in the above-identified patent and that said Letters Patent is hereby corrected as shown below:

In column 6, line 9, delete "5304," and insert -- S304, --, therefor.

In column 6, line 53, delete "5404," and insert -- S404, --, therefor.

In column 6, line 64, delete "5410," and insert -- S410, --, therefor.

In column 7, line 29, delete "5510." and insert -- S510. --, therefor.

In column 7, line 36, delete "5512," and insert -- S512, --, therefor.

In column 7, line 41, delete "5514," and insert -- S514, --, therefor.

In column 7, line 48, delete "5518," and insert -- S518, --, therefor.

Signed and Sealed this
Seventh Day of August, 2012

David J. Kappos
*Director of the United States Patent and Trademark Office*